US011239972B2

(12) United States Patent
Rico Alvarino et al.

(10) Patent No.: US 11,239,972 B2
(45) Date of Patent: Feb. 1, 2022

(54) LARGE CELL SUPPORT FOR NARROWBAND RANDOM ACCESS

(71) Applicant: QUALCOMM Incorporated, San Diego, CA (US)

(72) Inventors: Alberto Rico Alvarino, San Diego, CA (US); Renqiu Wang, San Diego, CA (US); Peter Gaal, San Diego, CA (US); Wanshi Chen, San Diego, CA (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/802,306

(22) Filed: Nov. 2, 2017

(65) Prior Publication Data

US 2018/0139025 A1 May 17, 2018

Related U.S. Application Data

(60) Provisional application No. 62/476,473, filed on Mar. 24, 2017, provisional application No. 62/423,744, filed on Nov. 17, 2016.

(51) Int. Cl.
*H04L 5/00* (2006.01)
*H04W 56/00* (2009.01)
*H04W 74/08* (2009.01)

(52) U.S. Cl.
CPC .......... *H04L 5/0053* (2013.01); *H04L 5/0048* (2013.01); *H04W 56/0035* (2013.01);
(Continued)

(58) Field of Classification Search
None
See application file for complete search history.

(56) References Cited

U.S. PATENT DOCUMENTS

2008/0101262 A1\* 5/2008 Brunel ................ H04W 52/343
370/278
2008/0101313 A1\* 5/2008 Choi ..................... H04W 72/06
370/342
(Continued)

FOREIGN PATENT DOCUMENTS

CN 102325382 A 1/2012
CN 105009479 A 10/2015

OTHER PUBLICATIONS

Specification, U.S. Appl. No. 62/353,533, filed Jun. 22, 2016.\*
(Continued)

*Primary Examiner* — Gregory B Sefcheck
*Assistant Examiner* — Suk Jin Kang
(74) *Attorney, Agent, or Firm* — Patterson & Sheridan, L.L.P

(57) ABSTRACT

Aspects of the present disclosure provide techniques and apparatus for performing narrowband physical random access channel (PRACH) procedures in large cells. For example, aspects of the present disclosure provide techniques for narrowband PRACH procedures (e.g., narrowband internet of things (NB-IoT)) to accommodate larger RTTs (e.g., up to 100 km). In some cases, supporting larger RTTs may involve a base station altering its PRACH processing by performing a two-step process of, first, obtaining a frequency domain phase offset based on an uplink signal from a UE, which provides a fractional delay and, second, performing a time domain correlation for different timing hypotheses to determine a timing offset based on the uplink signal. Supporting larger RTTs may also involve enabling a new NPRACH format that may coexist with legacy 3.75 kHz resources.

8 Claims, 16 Drawing Sheets

(52) U.S. Cl.
CPC ....... *H04W 56/0055* (2013.01); *H04W 74/08* (2013.01); *H04W 74/0833* (2013.01)

(56) References Cited

U.S. PATENT DOCUMENTS

| | | | | |
|---|---|---|---|---|
| 2008/0102753 | A1* | 5/2008 | Brunel | H04L 27/2607 455/39 |
| 2008/0240003 | A1* | 10/2008 | Brunel | H04B 7/2656 370/281 |
| 2008/0267303 | A1* | 10/2008 | Baldemair | H04B 1/7075 375/260 |
| 2009/0156214 | A1* | 6/2009 | Lee | H04W 36/30 455/436 |
| 2009/0196163 | A1* | 8/2009 | Du | H04L 5/0046 370/204 |
| 2009/0201984 | A1* | 8/2009 | Du | H04B 7/2621 375/240 |
| 2009/0232234 | A1* | 9/2009 | Du | H04B 7/2621 375/260 |
| 2011/0216715 | A1* | 9/2011 | Lundgren | H04L 27/2655 370/329 |
| 2011/0223901 | A1* | 9/2011 | Swarts | H04L 27/2675 455/422.1 |
| 2011/0237214 | A1* | 9/2011 | Swarts | H04W 56/00 455/226.1 |
| 2011/0243104 | A1* | 10/2011 | Swarts | H04L 27/2675 370/336 |
| 2012/0113828 | A1* | 5/2012 | Head | H04B 7/0617 370/252 |
| 2012/0250732 | A1* | 10/2012 | Arviv | H04B 1/7075 375/147 |
| 2012/0281792 | A1* | 11/2012 | Swarts | H04J 11/0069 375/343 |
| 2012/0314751 | A1* | 12/2012 | Suzuki | H04L 5/005 375/229 |
| 2013/0044617 | A1* | 2/2013 | Boixadera | H04W 56/0045 370/252 |
| 2013/0051433 | A1* | 2/2013 | Hiscock | H04B 1/69 375/139 |
| 2013/0142165 | A1* | 6/2013 | Swarts | H04L 27/2657 370/330 |
| 2013/0163536 | A1* | 6/2013 | Anderson | H04W 72/1284 370/329 |
| 2013/0163537 | A1* | 6/2013 | Anderson | H04W 72/1284 370/329 |
| 2013/0176941 | A1* | 7/2013 | Swarts | H04J 11/0073 370/328 |
| 2014/0169303 | A1 | 6/2014 | Jami et al. | |
| 2014/0329553 | A1 | 11/2014 | Nakashima et al. | |
| 2015/0181595 | A1 | 6/2015 | Li et al. | |
| 2015/0181624 | A1* | 6/2015 | Hwang | H04W 74/0841 370/329 |
| 2015/0208271 | A1* | 7/2015 | Love | G01S 1/30 370/252 |
| 2016/0099822 | A1* | 4/2016 | Thein | H04L 5/0051 375/260 |
| 2016/0156493 | A1 | 6/2016 | Bae et al. | |
| 2016/0353486 | A1* | 12/2016 | Xia | H04W 72/044 |
| 2017/0034818 | A1* | 2/2017 | Jha | H04W 72/0446 |
| 2017/0171865 | A1* | 6/2017 | Hwang | H04L 5/00 |
| 2017/0201405 | A1* | 7/2017 | Huang | H04L 5/0007 |
| 2017/0245231 | A1* | 8/2017 | Huang | H04L 27/2613 |
| 2017/0317806 | A1* | 11/2017 | Beale | H04L 27/0012 |
| 2017/0331670 | A1* | 11/2017 | Parkvall | H04W 52/0274 |
| 2017/0332359 | A1* | 11/2017 | Tsai | H04B 7/0617 |
| 2017/0339453 | A1* | 11/2017 | Kwon | H04L 69/22 |
| 2018/0035471 | A1* | 2/2018 | Tabet | H04W 52/34 |
| 2018/0041857 | A1* | 2/2018 | Ouchi | H04W 72/04 |
| 2018/0049169 | A1* | 2/2018 | Lin | H04L 5/0051 |
| 2018/0049181 | A1* | 2/2018 | Wu | H04W 48/12 |
| 2018/0063869 | A1* | 3/2018 | Zhang | H04W 74/004 |
| 2018/0092064 | A1* | 3/2018 | Ryu | H04L 5/00 |
| 2018/0098298 | A1* | 4/2018 | Jung | H04L 27/266 |
| 2018/0123761 | A1* | 5/2018 | Kim | H04L 27/2627 |
| 2018/0152924 | A1* | 5/2018 | Ouchi | H04W 48/10 |
| 2018/0184434 | A1* | 6/2018 | Blankenship | H04L 1/1812 |
| 2018/0192426 | A1* | 7/2018 | Ryoo | H04L 5/00 |
| 2018/0198646 | A1* | 7/2018 | Gau | H04W 56/0015 |
| 2018/0206271 | A1* | 7/2018 | Chatterjee | H04L 5/0053 |
| 2018/0219663 | A1* | 8/2018 | Lin | H04W 74/0833 |
| 2018/0249509 | A1* | 8/2018 | Yi | H04J 11/0069 |
| 2018/0255521 | A1* | 9/2018 | Reial | H04W 56/001 |
| 2018/0262900 | A1* | 9/2018 | Moon | H04J 11/0073 |
| 2018/0263064 | A1* | 9/2018 | Islam | H04W 56/0015 |
| 2018/0270008 | A1* | 9/2018 | Yi | H04J 11/0069 |
| 2018/0279135 | A1* | 9/2018 | Hwang | H04L 5/0094 |
| 2018/0279262 | A1* | 9/2018 | Babaei | H04W 72/04 |
| 2018/0279358 | A1* | 9/2018 | Babaei | H04W 72/14 |
| 2018/0279363 | A1* | 9/2018 | Su | H04W 74/085 |
| 2018/0279381 | A1* | 9/2018 | Tabet | H04J 13/0062 |
| 2018/0279387 | A1* | 9/2018 | Hui | H04W 74/0891 |
| 2018/0287844 | A1* | 10/2018 | Kim | H04L 5/00 |
| 2018/0294910 | A1* | 10/2018 | Kim | H04J 11/00 |
| 2018/0295007 | A1* | 10/2018 | Kumar | H04L 27/2613 |
| 2018/0295614 | A1* | 10/2018 | Parkvall | H04W 74/004 |
| 2019/0029003 | A1* | 1/2019 | Takeda | H04W 4/06 |
| 2019/0036756 | A1* | 1/2019 | Yi | H04J 11/0069 |
| 2019/0081832 | A1* | 3/2019 | Marinier | H04L 5/0053 |
| 2019/0098626 | A1* | 3/2019 | Yi | H04W 72/02 |
| 2019/0104551 | A1* | 4/2019 | Deenoo | H04W 74/0833 |
| 2019/0116007 | A1* | 4/2019 | Yi | H04W 4/42 |
| 2019/0159154 | A1* | 5/2019 | Kim | H04B 7/0617 |
| 2019/0215121 | A1* | 7/2019 | Lin | H01M 10/0585 |
| 2019/0223157 | A1* | 7/2019 | Hwang | H04L 27/2602 |
| 2019/0239170 | A1* | 8/2019 | Thangarasa | H04W 52/365 |
| 2019/0260566 | A1* | 8/2019 | Bach | H04W 72/0446 |
| 2019/0260628 | A1* | 8/2019 | Lin | H04J 13/0062 |
| 2019/0320337 | A1* | 10/2019 | Siomina | H04L 27/2607 |
| 2019/0320467 | A1* | 10/2019 | Freda | H04W 74/0833 |
| 2019/0357239 | A1* | 11/2019 | Moon | H04L 5/0007 |
| 2020/0112413 | A1* | 4/2020 | Lin | H04W 74/0833 |
| 2020/0187269 | A1* | 6/2020 | Tabet | H04J 13/0062 |
| 2020/0195482 | A1* | 6/2020 | Ko | H04J 11/0076 |
| 2020/0275496 | A1* | 8/2020 | Stern-Berkowitz | H04W 74/0833 |
| 2020/0336249 | A1* | 10/2020 | Yi | H04L 5/00 |

OTHER PUBLICATIONS

Catt: "Analysis on NR Initial Access", 3GPP Draft; R2-164816, 3rd Generation Partnership Project (3GPP), Mobile Competence Centre; 650, Route Des Lucioles; F-06921, Sophia-Antipolis Cedex; France, Val. RAN WG2, No. Gothenburg, Sweden, Aug. 21, 2016, XP051126522, Retrieved from the Internet: URL:http://www.3gpp.org/ftp/Meetings_3GPP_SYNC/RAN2/Docs/, pp. 1-4.

Ericsson., et al., "NB LTE—Concept Description L1," 3GPP Draft; RP-151397—NB-LTE—Concept Description L1, 3rd Generation Partnership Project (3GPP), Mobile Competence Centre ; 650, Route Des Lucioles ; F-06921 Sophia-Antipolis Cedex ; France vol. TSG RAN, No. Phoenix, Arizona, USA; Sep. 14, 2015-Sep. 16, 2015 Sep. 8, 2015 (Sep. 8, 2015), XP051039282, Retrieved from the Internet: URL:http://www.3gpp.org/ftp/Meetings_3GPP_SYNC/RAN/Docs/ [retrieved on Sep. 8, 2015], 24 pages.

International Search Report and Written Opinion—PCT/US2017/059833—ISA/EPO—dated Jun. 18, 2018.

NSN: "PRACH preamble analysis for S-UMTS", 3GPP Draft; R1-141665, 3rd Generation Partnership Project (3GPP), Mobile Competence Centre; 650, Route Des Lucioles; F-06921, Sophia-Antipolis Cedex; France, Val. RAN WG2, No. Shenzhen, P.R. China, Mar. 30, 2014, XP050787332, Retrieved from the Internet: URL:http://www.3gpp.org/ftp/Meetings_3GPP_SYNC/RAN1/Docs/, pp. 4.

Qualcomm Incorporated: "Random Access Channel Design" 3GPP Draft; R1-160883, 3rd Generation Partnership Project (3GPP), Mobile Competence Centre; 650, Route Des Lucioles; F-06921, Sophia-Antipolis Cedex; France, Val. RAN WG1, No. St Julian's. Malta, Feb. 14, 2016, XP051054207, Retrieved from the Internet: URL: http://www.3gpp.org/ftp/Meetings_3GPP_SYNC/RAN1/Docs/, pp. 1-4.

(56) References Cited

OTHER PUBLICATIONS

Alcatel-Lucent et al., "Analysis of Impact of Cell Range Extension", 3GPP Draft; R1-094601, 3rd Generation Partnership Project (3GPP), Mobile Competence Centre, 650, Route Des Lucioles, F-06921, Sophia-Antipolis Cedex, France, No. Jeju; Nov. 9, 2009, Nov. 9, 2009, XP050389012, [retrieved on Nov. 3, 2009], 3 pages.
Ericsson: "NR Random-Access Response Design", 3GPP Draft; R1-1611911_RAR_DESIGN, 3rd Generation Partnership Project (3GPP), Mobile Competence Centre, 650, Route Des Lucioles, F-06921, Sophia-Antipolis Cedex, France, vol. RAN WG1, No. Reno, NV, USA; Nov. 14, 2016-Nov. 18, 2016 Nov. 13, 2016, XP051175877, Retrieved from the Internet: URL:http://www.3gpp.org/ftp/Meetings_3GPP_SYNC/RAN1 /Docs/ [retrieved on Nov. 13, 2016], 2 pages.
Partial International Search Report—PCT/US2017/059833—ISA/EPO—dated Feb. 16, 2018.
Taiwan Search Report—TW106138075—TIPO—dated Feb. 7, 2021.

* cited by examiner

Received signal

Alt 1: Delayed version of these resources

Alt 2: Non-delayed version of these resources

LARGE CELL SUPPORT FOR NARROWBAND RANDOM ACCESS

CROSS-REFERENCE TO RELATED APPLICATIONS

This application claims the benefit of U.S. Application Ser. No. 62/423,744 entitled "LARGE CELL SUPPORT FOR NARROWBAND RANDOM ACCESS," which was filed on Nov. 17, 2016, and U.S. Application Ser. No. 62/476,473 entitled "LARGE CELL SUPPORT FOR NARROWBAND RANDOM ACCESS," which was filed on Mar. 24, 2017. The aforementioned applications are herein incorporated by reference in their entirety.

BACKGROUND

Field of the Disclosure

Certain aspects of the present disclosure generally relate to wireless communications and, more particularly, to narrowband random access channel procedures in large cells.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Narrowband Internet of Things (NB-IoT) devices may utilize a narrowband physical random access channel (NPRACH) for communicating random access preamble used for initiating the random access procedures for data transfer. In some cases, a NPRACH structure may include a cyclic prefix (CP) suitable to accommodate round trip times (RTTs) in different cell sizes. For example, in some cases a first CP a RTT of up to 10 km, while a second CP may cover a RTT of up to 40 km. However, current NPRACH structures may not able to accommodate larger RTTs, such as up to 100 km.

Accordingly, aspects of the present disclosure provide techniques for narrowband PRACH procedures (such as NB-IoT) to accommodate larger RTTs (e.g., up to 100 km). In some cases, supporting larger RTTs may involve a base station altering its PRACH processing by performing a two-step process of, first, obtaining a frequency domain phase offset based on an uplink signal from a UE, which provides a fractional delay and, second, performing a time domain correlation for different timing hypotheses to determine a timing offset based on the uplink signal. In addition, certain aspects of the present disclosure also involve enabling a new NPRACH format that may coexist with legacy 3.75 kHz resources.

Certain aspects of the present disclosure provide a method for wireless communications by a base station. The method generally includes obtaining a frequency domain phase offset based on an at least one uplink signal from a user equipment (UE) transmitted during a random access channel (RACH) procedure, and performing a time domain correlation for different timing hypotheses to determine a timing offset based on the uplink signal.

Certain aspects of the present disclosure provide an apparatus for wireless communication in a wireless network. The apparatus generally includes means for obtaining a frequency domain phase offset based on an at least one uplink signal from a user equipment (UE) transmitted during a random access channel (RACH) procedure and, means for performing a time domain correlation for different timing hypotheses to determine a timing offset based on the uplink signal.

Certain aspects of the present disclosure provide a method for wireless communications by a user equipment. The method generally includes performing a physical random access channel (PRACH) procedure with a base station and transmitting a first message to the base station using an adjusted timing advance (TA) value that is different than a TA value received from the base station in a random access response (RAR) message.

Certain aspects of the present disclosure provide an apparatus for wireless communication in a wireless network. The apparatus generally includes means performing a physical random access channel (PRACH) procedure with a base station and, means for transmitting a first message to the base station using an adjusted timing advance (TA) value that is different than a TA value received from the base station in a random access response (RAR) message.

Certain aspects of the present disclosure provide a method for wireless communications by a user equipment. The method generally includes transmitting, as part of a physical random access channel (PRACH) procedure, a PRACH signal to a base station with no timing advance (TA) or a first TA value and re-transmitting the PRACH signal using a second TA value after a failure of the PRACH procedure.

Certain aspects of the present disclosure provide an apparatus for wireless communication in a wireless network. The apparatus generally includes means for transmitting, as part of a physical random access channel (PRACH) procedure, a PRACH signal to a base station with no timing advance (TA) or a first TA value and, means for re-transmitting the PRACH signal using a second TA value after a failure of the PRACH procedure.

Certain aspects of the present disclosure provide a method for wireless communications by a user equipment. The method generally includes determining a numerology for transmitting a physical random access channel (PRACH) signal to a base station and transmitting the PRACH signal in accordance with the determined numerology.

Certain aspects of the present disclosure provide an apparatus for wireless communication in a wireless network. The apparatus generally includes at least one processor configured to determine a numerology for transmitting a physical random access channel (PRACH) signal to a base station, and transmit the PRACH signal in accordance with the determined numerology.

Certain aspects of the present disclosure provide an apparatus for wireless communication in a wireless network. The apparatus generally includes means for determining a numerology for transmitting a physical random access channel (PRACH) signal to a base station, and means for transmitting the PRACH signal in accordance with the determined numerology.

Certain aspects of the present disclosure provide a method for wireless communications by a user equipment. The method generally determining a scrambling sequence for transmitting a physical random access channel (PRACH) signal to a base station based, at least in part, on capabilities of the UE, and transmitting the PRACH signal using the determined scrambling sequence. Certain aspects of the present disclosure provide an apparatus for wireless communication in a wireless network. The apparatus generally includes means for determining a scrambling sequence for transmitting a physical random access channel (PRACH) signal to a base station based, at least in part, on capabilities of the UE, and means for transmitting the PRACH signal using the determined scrambling sequence.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
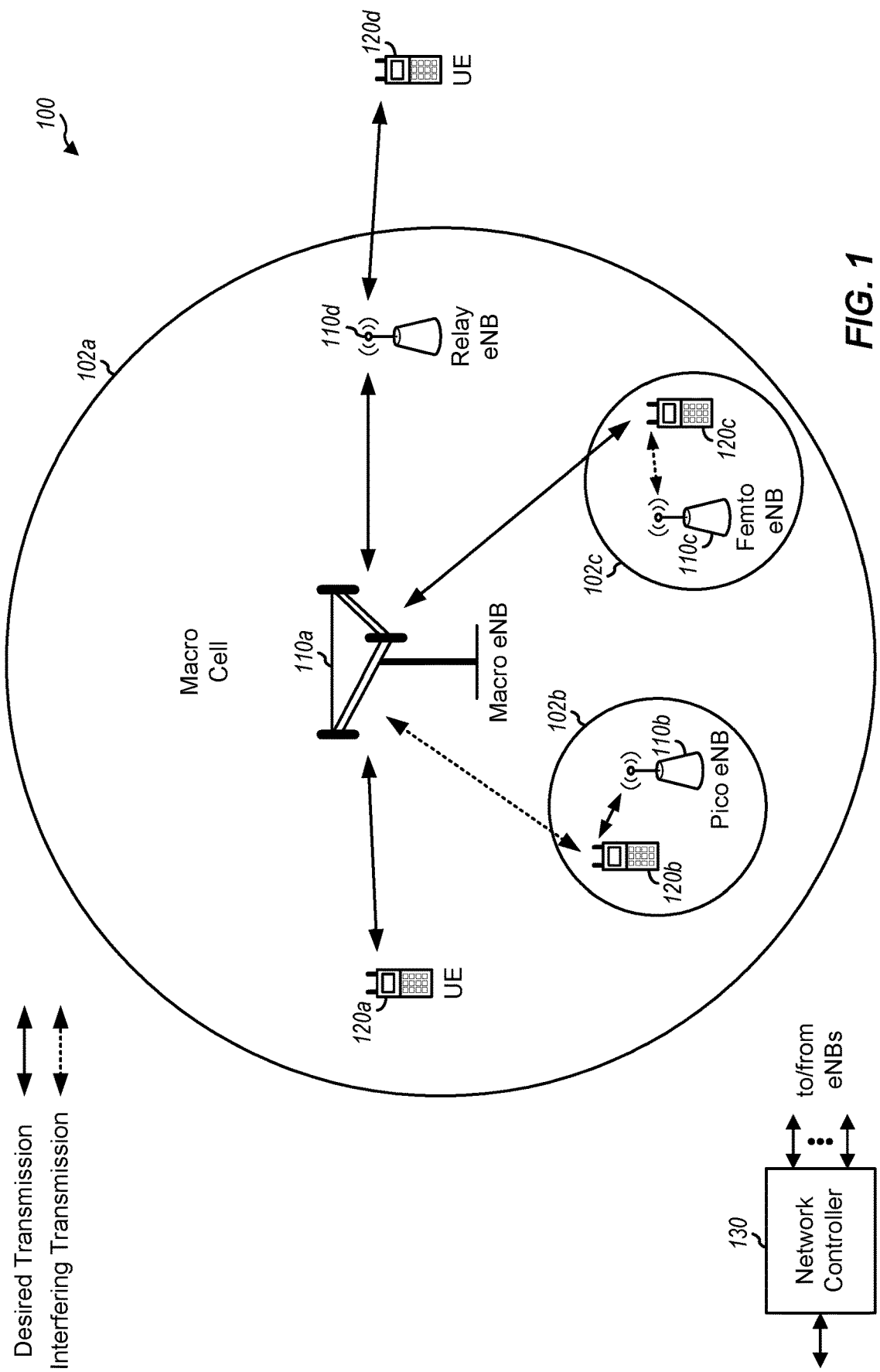
FIG. 1 is a block diagram conceptually illustrating an example of a wireless communication network, in accordance with certain aspects of the present disclosure.

Aspects of the present disclosure provide techniques for performing random access procedures for narrowband (NB) internet-of-things (IoT) devices deployed in relatively large cells. For example, as described in greater detail below, a narrowband physical random access channel (NPRACH) may be used to communicate a random access preamble and initiate random access procedures for transferring data. In some cases, an NPRACH structure may include a cyclic prefix (CP) for accommodating different round trip times (RTTs). Currently, NPRACH CPs may only accommodate RTTs up to a certain distance (e.g., 40 km). Thus, aspects of the present disclosure provide techniques for narrowband PRACH procedures (such as NB-IoT) to accommodate larger RTTs (e.g., up to 100 km). In addition, certain aspects of the present disclosure also involve enabling a new NPRACH format that may coexist with legacy 3.75 kHz resources.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, virtual reality goggles, smart ring, smart clothing), displays (e.g., heads-up displays), healthcare devices, medical devices, vehicular devices, navigation devices, entertainment devices (e.g., music players, game consoles), etc. Some UEs may be considered machine-type communication (MTC) UEs, which may include remote devices, such as drones, robots, sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC devices, as well as other devices, may include internet-of-things (IoT) (e.g., NB-IoT) devices.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, techniques presented herein may be used to perform paging and/or random access operations for narrowband IoT with multiple PRBs. In aspects, one or more of the UEs 120 (e.g., IoT devices) in the network 100 may have capabilities that are different compared to other UEs 120 in the network 100. In one example, some of the UEs 120 may have the capability to support multiple PRB operations (e.g., operations in an anchor PRB and one or more non-anchor PRBs) for NB IoT, whereas some of the UEs 120 may have the capability to support single PRB operations (e.g., operations in an anchor PRB) for narrowband IoT.

In aspects, a base station (e.g., eNB 110) may determine different sets of resources that are available for narrowband communications with one or more different sets of UEs 120 (e.g., IoT devices). Each set of UEs 120 may include UEs of a particular type (or capability) (e.g., such as whether the UEs support multiple PRB operations for NB IoT). The eNB 110 may allocate the different sets of resources to the UEs 120 in the different sets based, at least in part, on the type of UEs 120. Once allocated, the eNB 110 may transmit an indication of the allocation to the UEs 120.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, wearables (e.g., smart watch, smart bracelet, smart glasses, virtual reality goggles, smart ring, smart clothing), gaming devices, entertainment devices, cameras, music players, medical/healthcare devices, vehicular devices, navigation/positioning devices, etc. MTC UEs may include remote devices, such as drones, robots/robotic devices, sensors, meters, cameras, monitors, location tags, etc., that may communicate with a base station, another remote device, or some other entity. MTC devices, as well as other types of devices, may include internet of everything (IoE) or IoT devices, such as NB-IoT devices, and techniques disclosed herein may be applied to MTC devices, NB-IoT devices, as well as other devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
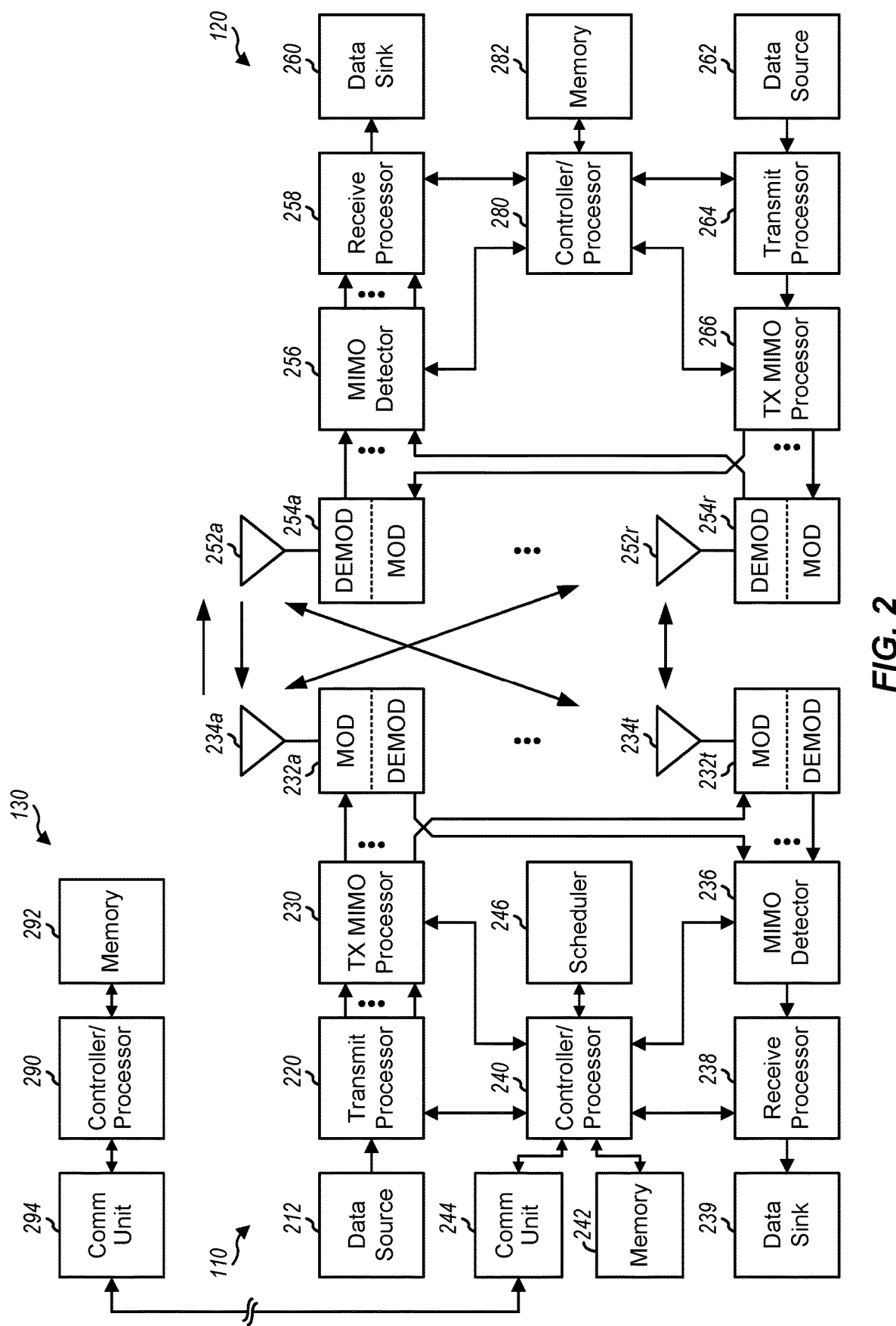
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for paging and/or random access procedures for narrowband IoT with multiple PRBs. For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120 may perform or direct operations 800 in FIG. 8, operations 900 in FIG. 9, operations 1000 in FIG. 10, and operations 1100 in FIG. 11. Similarly, controller/processor 240 and/or other controllers/processors and modules at BS 110 may perform or direct operations 600 in FIG. 6. Memories 242 and 282 may store data and program codes for base station 110 and UE 120, respectively. A scheduler 246 may schedule UEs for data transmission on the downlink and/or uplink.

Figure 3:
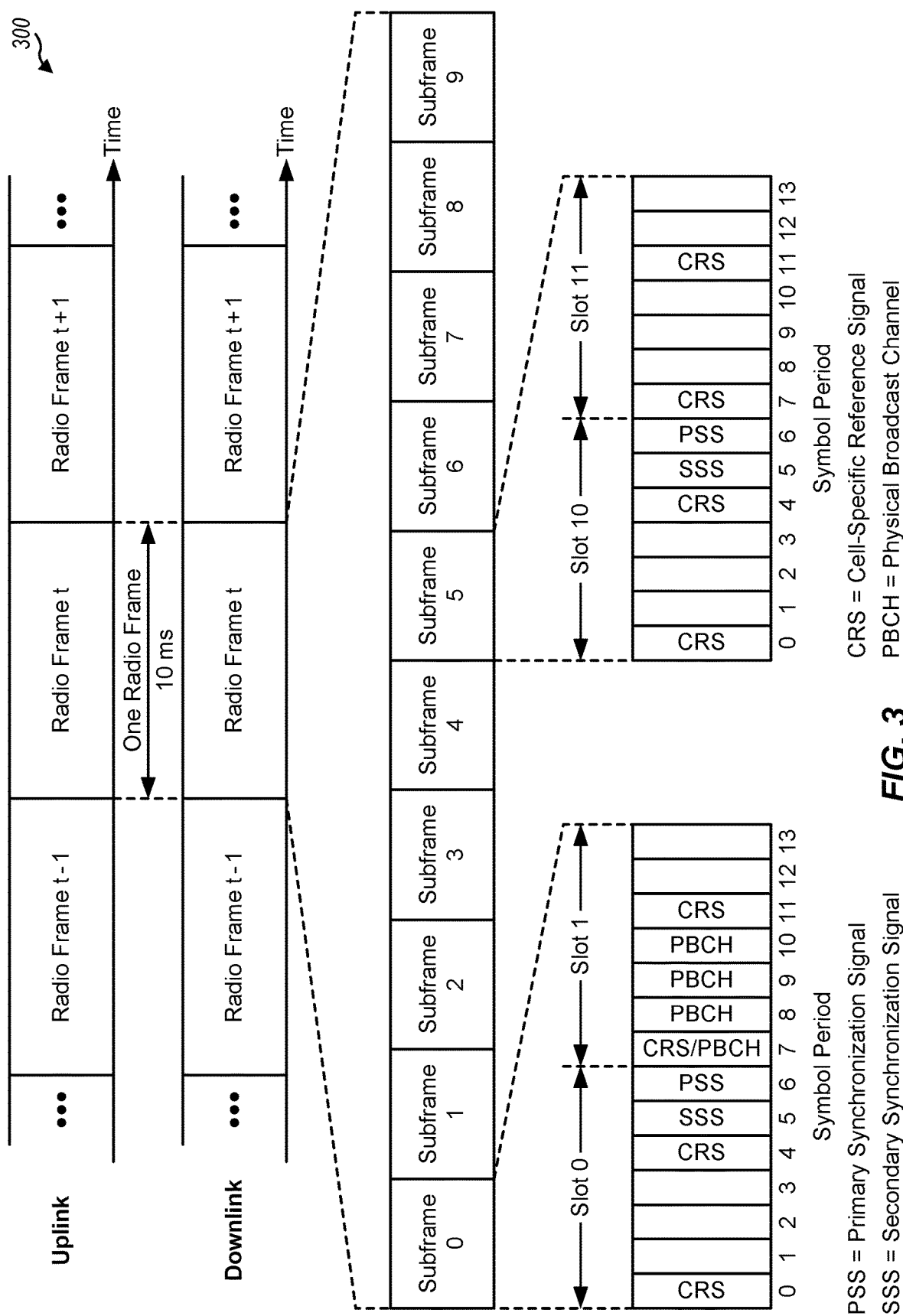
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
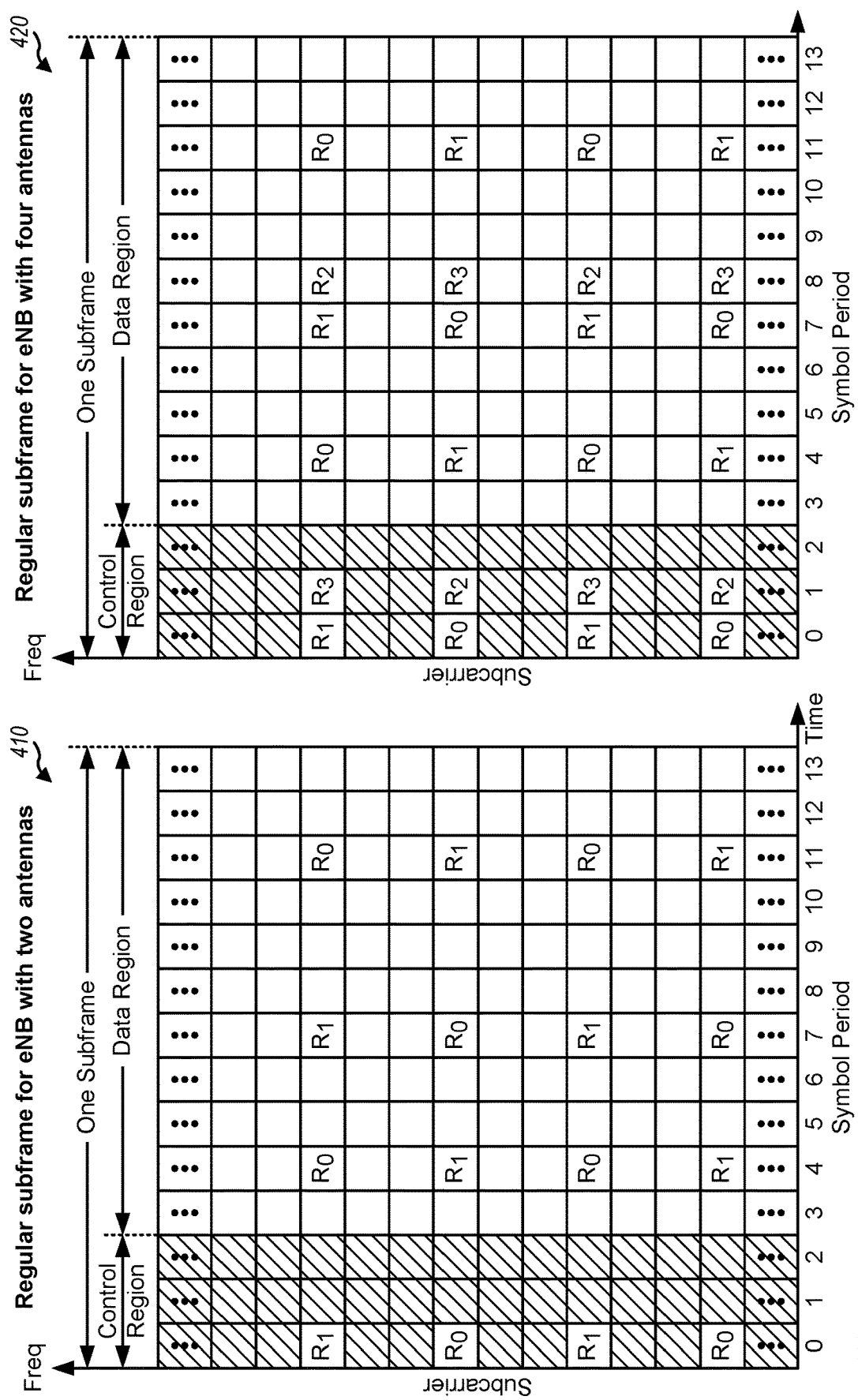
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB. eMTC UEs may support narrowband operation while operating in a wider system bandwidth (e.g., 1.4/3/5/10/15/20 MHz). Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRBs). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

The wireless communication network (e.g., LTE Release 13, or greater) may support a 180 kHz deployment (e.g., one PRB) for narrowband operation (or NB-IoT) with different deployment modes. In one example, narrowband operations may be deployed in-band, for example, using resource blocks within a wider system bandwidth. In one case, narrowband operations may use one resource block within the wider system bandwidth of an LTE network. In this case, the 180 kHz bandwidth for the resource block may have to be aligned with a wideband LTE resource block. In one example, narrowband operations may be deployed in a standalone mode of operation. In one example, narrowband operations may be deployed in the unused resource blocks within a LTE carrier guard-band. In this deployment, the 180 kHz RB within the guard band may have to be aligned with a 15 kHz tone grid of wideband LTE, for example, in order to use the same FFT and/or reduce interference in-band legacy LTE communications.

In some wireless networks (e.g., LTE Release 13), one PRB of the NB-IoT resources can be used as an "anchor PRB" for one or more narrowband operations. For example, narrowband primary synchronization signals (PSS), narrowband secondary synchronization signals (SSS), master information block (MIB), system information block (SIB), random access messages, paging messages, etc., can be transmitted on the anchor PRB. Further, once a given UE is connected mode, the UE can move to a different PRB (e.g., non-anchor PRB) for other operations.

Example Large Cell Support for Narrowband Random Access

A narrowband Internet of Things (NB-IoT) physical random access channel (NPRACH) structure may include a cyclic prefix (CP) plus 5 symbols (single tone). A PRACH is used to carry random access preambles used for initiating random access procedures. Each symbol in the NPRACH structure may have a duration of 266.7 us, while the CP may be 66.7 or 266.7 us. The different CPs may be suitable to accommodate round trip times (RTTs) in different cell sizes. For example, a CP of 66.7 us may cover a RTT of up to 10 km, while a CP of 266.7 us may cover a RTT of up to 40 km. In some cases, a RTT may refer to a length of time it takes for a signal to be transmitted plus the length of time it takes for an acknowledgement of that signal to be received by the transmitter.

Aspects of the present disclosure provide techniques for narrowband PRACH procedures (such as NB-IoT) to accommodate larger RTTs (e.g., up to 100 km). In some cases, the techniques may be based on different principles, such as an eNB implementation, enhanced UE procedures, or enhanced NPRACH signaling.

Figure 5:
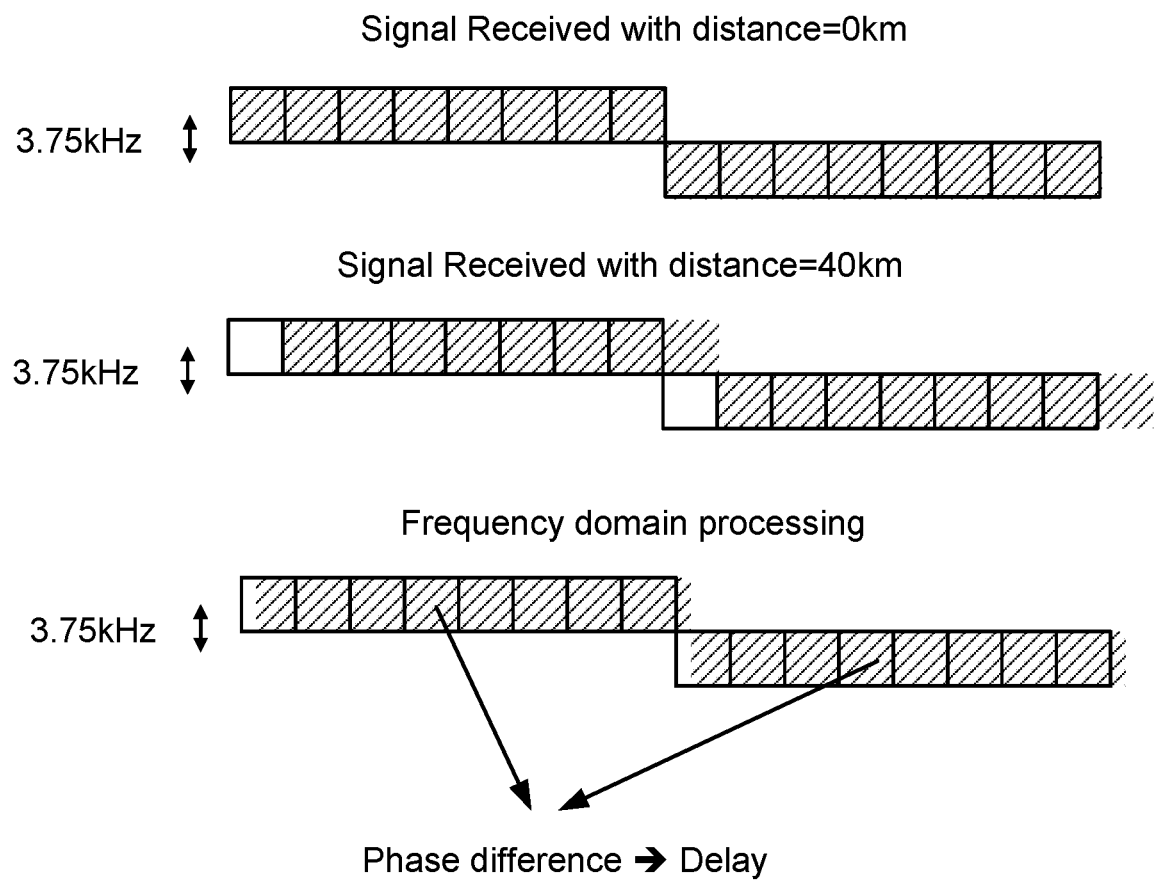
FIG. 5 illustrates example PRACH symbol timing that may be addressed, in accordance with certain aspects of the present disclosure.

In some cases, identical NPRACH symbols may be transmitted back to back. As illustrated in FIG. 5, this may create confusion, since the signal shifted by 1 symbol is very similar to the original signal.

Conventional PRACH processing implies a phase difference in the frequency domain, but this can only provide the fractional time offset. After the delay is obtained, the eNB sends the timing advance in message 2, and the next transmissions use this timing advance to preserve orthogonality. Unfortunately, due to the 1 (or more) symbol shift shown in FIG. 5, the adjusted timing advance (TA) may be off by an integer symbol duration.

Aspects of the present disclosure, however, may address this issue by utilizing a two-step process for PRACH signal processing. For example, a first step of the two-step process may include obtaining a frequency domain phase offset based on an at least one uplink signal from a user equipment (UE) transmitted during a random access channel (RACH) procedure. Thereafter, a second step of the two-step process may include performing a time domain correlation for different timing hypotheses, as further described below, to determine a timing offset based on the uplink signal. As NPRACH symbols are transmitted back to back and are also identical, performing this two-step process effectively avoids any confusion (e.g., in instances where the signal is shifted by 1 symbol and looks identical to the original signal) when processing the NPRACH symbols.

Figure 6:
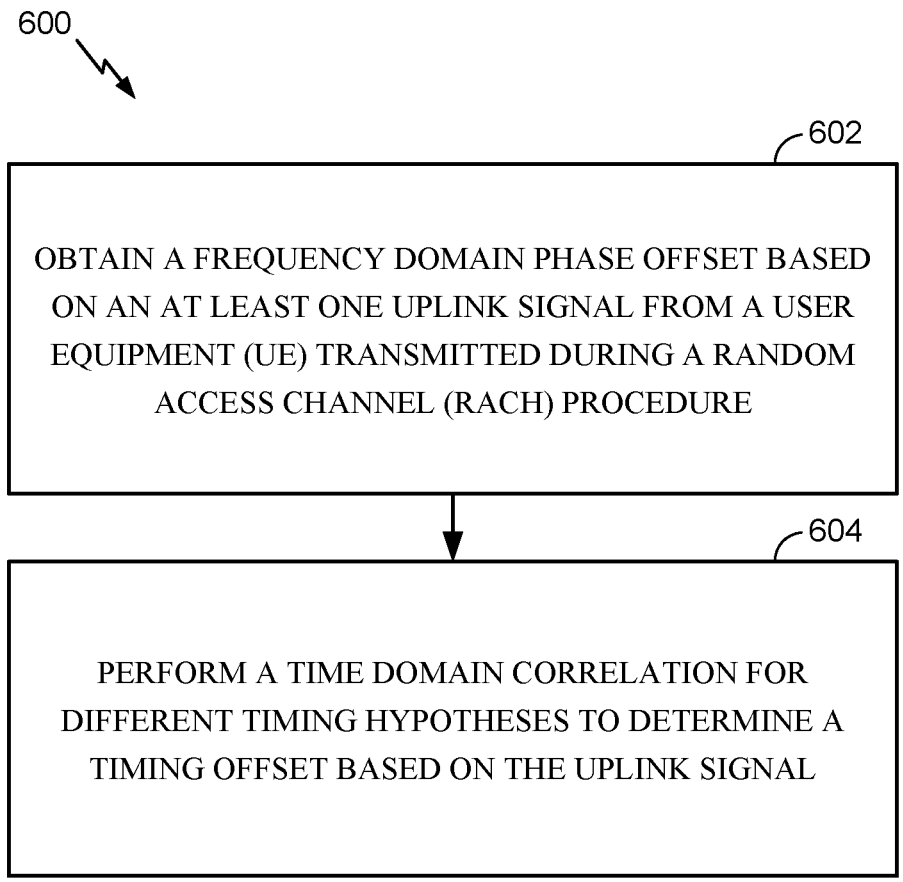
FIG. 6 is a flow diagram illustrating example operations for wireless communications by a base station, in accordance with certain aspects of the present disclosure.

FIG. 6 illustrates example operations 600 for wireless communications. Operations 600 may be performed, for example, by a wireless communications device, such as a base station (e.g., BS 110) for determining a timing offset based on an uplink signal received from a UE (e.g., US 120) during a RACH procedure.

According to certain aspects, the base station may include one or more components as illustrated in FIG. 2 that may be configured to perform the operations described herein. For example, the antenna 234, demodulator/modulator 232, controller/processor 240, and/or memory 242 as illustrated in FIG. 2 may perform the operations described herein.

Operations 600 begin, at 602, by obtaining a frequency domain phase offset based on at least one uplink signal from a user equipment (UE) transmitted during a random access channel (RACH) procedure. Obtaining a frequency domain phase offset provides the fractional delay that is caused by the distance between the UE and the BS. After this delay is obtained, as described above, under conventional PRACH processing, the BS may send the timing advance in message 2, and the next transmissions use this timing advance to preserve orthogonality. However, as also described above, due to the 1 (or more) symbol shift shown in FIG. 5, the timing advance (TA) may be off by an integer symbol duration. Also, as described above, NPRACH symbols are transmitted back to back and are identical, which may lead to confusion when the BS is processing the NPRACH symbols. Accordingly, a time domain correlation may be performed, as described by step 604 below, which effectively helps avoid any confusion when the BS is processing the NPRACH symbols. In some embodiments, the uplink signal includes a physical random access channel (PRACH) signal and/or a message (e.g., message 3 as described below) transmitted by the UE after the PRACH signal.

At 604, the BS performs a time domain correlation for different timing hypotheses to determine a timing offset based on the uplink signal. In some embodiments, a time-domain correlation analysis refers to non-parametric estimation of the impulse response of dynamic systems as a finite impulse response (FIR) model from the data. For example, the time-domain correlation may be performed with different integer timing hypotheses (e.g., 1 symbol, 2 symbols, 3 symbols). The time domain correlation analysis is performed to determine a timing offset corresponding to the delay that is caused by the distance from the UE to the BS. Thus each symbol (i.e., timing hypothesis) corresponds to a distance/transmission delay resulting from the distance between the UE and the BS. Determining the timing offset enables the BS to accurately process the NPRACH symbols without any confusion.

In some embodiments, the time domain correlation (i.e., step 604 of operations 600) analysis may be performed only if the cell size is large. For example, for a normal cell size (e.g., ~10 km), step 604 may not be performed. For larger cell sizes (e.g., ~50 km) hypotheses of 0 and 1 symbol delays may be evaluated. For even larger cell sizes (e.g., ~100 km) hypotheses of 0, 1 and 2 symbols may be evaluated. Accordingly, the integer numbers of symbols may be selected, at least in part, based on the size of the cell.

In some embodiments, in selecting the integer numbers of symbols, the time domain correlation also takes into account the percentage (or prior probability) of each UE being a certain distance from the base station (e.g., within a <40 km, <80 km, <120 km radius). For example, the time-domain correlation for 120 km may be slightly higher than the one for 40 km, but the eNB may send the timing advance corresponding to 40 km, because there may be a much higher probability the UE is within 40 km than (outside of 40 km and) within 120 km.

In some cases, the timing hypothesis may be (additionally or alternatively) performed for another signal transmitted by the UE during a RACH procedure, such as message 3 (i.e., message transmitted by the UE after the PRACH signal). In this case, in a first step (e.g., step 602), the eNB may detect the wrong timing hypothesis for NPRACH (or not perform timing hypothesis for NPRACH at all). In a second step (and potentially depending on the outcome of the first stage, e.g. depending on whether multiple timing hypothesis are close to each other), the eNB tries to decode msg3 with different timing hypothesis. In some embodiments, the time domain correlation is performed for the different timing hypotheses to determine the timing offset based on both the PRACH signal and/or message 3 sent by the UE during the RACH procedure.

The different timing hypotheses may be in terms of integer number of symbols. For example, the integer numbers may be {−2, −1, 0, 1, 2} symbols if subcarrier spacing in 3.75 kHz, and {−8, −4, 0, 4, 8} symbols if subcarrier spacing is 15 kHz.

Figure 6A:
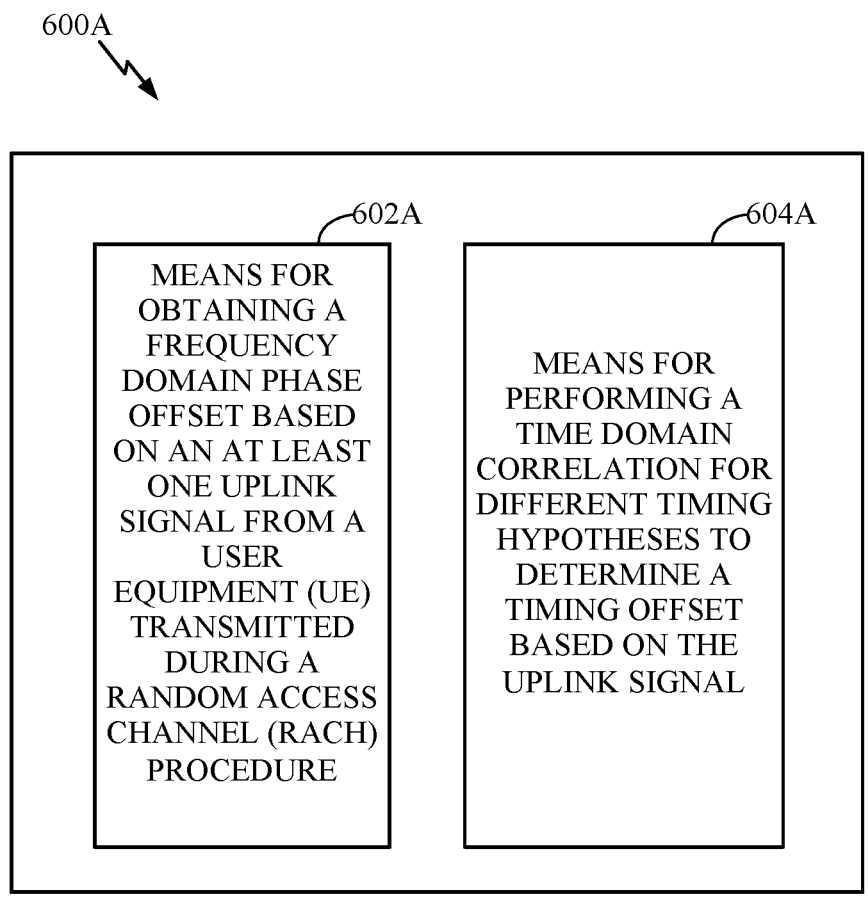
FIG. 6A shows a communication device illustrating means for performing operations for wireless communications, according to certain aspects of the present disclosure.

FIG. 6A illustrates a communications device 600A that may include various means-plus-function components configured to perform the operations illustrated in FIG. 6. For example, at 602A, the communications device 600A includes means for performing the operations illustrated at 602 in FIG. 6. Particularly, in one or more cases, the purpose of the means 602A is to serve as a receiving element (e.g., antenna 234, demodulator 232, etc.) for a BS (e.g., BS 110) for receiving an uplink signal transmitted by a UE during a random access channel (RACH) procedure. Additionally, the purpose of the means 602A is to serve as a processing element (e.g., controller/processor 240) for obtaining a frequency domain phase offset based on the uplink signal received from the UE.

Additionally, at 604A, the communications device 600A includes means for performing the operations illustrated at 604 in FIG. 6. Particularly, in one or more cases, the purpose of the means 604A is to serve as a processing element (e.g., controller/processor 240) for the BS 110 for performing a time domain correlation for different timing hypotheses to determine a timing offset based on the uplink signal. For example, the processing element may take an integer timing hypothesis (e.g., 1 symbol, 2 symbols, 3 symbols) as input to perform a time domain correlation analysis that results in a timing offset corresponding to the delay that is caused by the distance from the UE to the BS 110.

Figure 7:
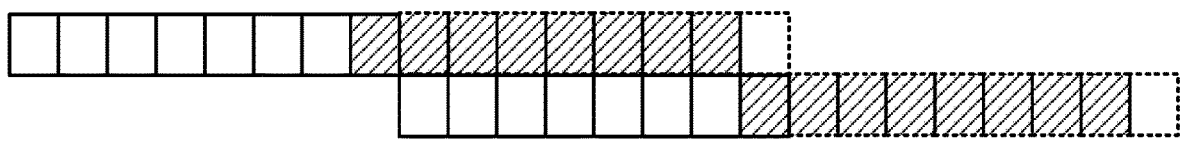
FIG. 7 illustrates example PRACH symbol timing, in accordance with certain aspects of the present disclosure.
Figure 7:
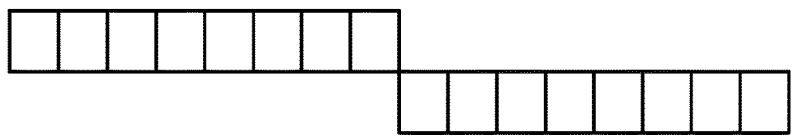
Figure 7:
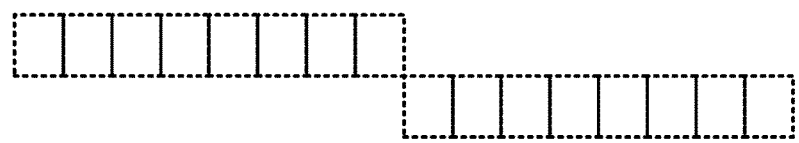

As illustrated in FIG. 7, in some extreme cases, the eNB (e.g., BS 110) may not be able to determine if the transmission belongs to a first resource or a second resource. To address this, the eNB may send a response for both resources, with the corresponding TA for each. Each resource may be distinguished (in the RAR), for example, by the RAPID (Preamble ID) field sent in the msg2 (RAR). As an example, the eNB may send:

RAPID 1: TA=7 symbols
RAPID 2: TA=−1 symbol

Since the UE is able to determine its RAPID, it only processes one of them.

In some cases, the eNB may not have implemented the integer/fractional PRACH detector (e.g., as described above). In such cases, the integer offset may be assumed to be zero. This may cause problems, however. For example, if a UE is at certain distance (e.g. 41 km) from the eNB, it may receive a TA for a distance corresponding to 1 symbol duration delay (e.g., 1 km), and the transmission of msg3 will fail due to applying the incorrect TA.

If the UE receives the wrong TA, the following sequence would occur with conventional PRACH processing:

1. UE transmits NPRACH
2. UE receives RAR (with wrong TA)
3. UE transmits msg3 (applying wrong TA), the eNB doesn't receive it
4. UE monitors for msg4, and does not get it According to certain aspects of the present disclosure, if this is repeated many times, the UE may assume that the TA is wrong (due to ambiguity), and may (autonomously) try a different TA value.

Figure 8:
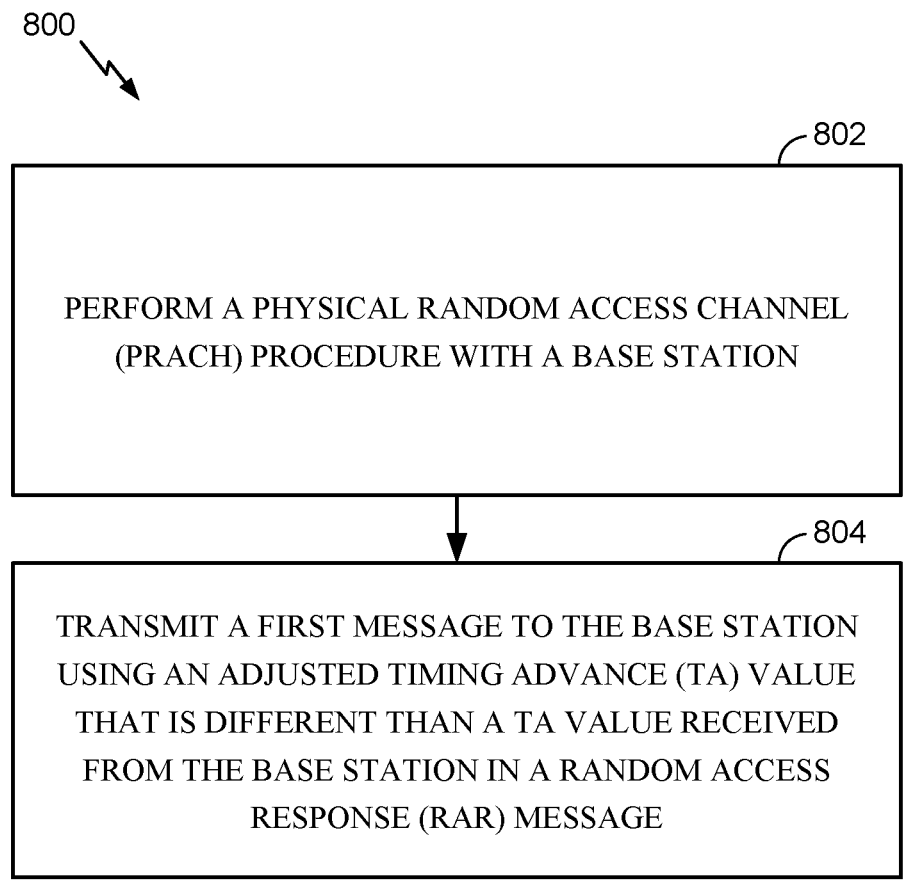
FIG. 8 is a flow diagram illustrating example operations for wireless communications by a UE, in accordance with certain aspects of the present disclosure.

FIG. 8 illustrates example operations 800 for wireless communications. Operations 800 may be performed, for example, by a UE (e.g., UE 120) for transmitting an adjusted TA value when the UE repeatedly receives the wrong TA from a BS (e.g., BS 110) while performing a PRACH procedure.

The operations begin, at 802, by performing a physical random access channel (PRACH) procedure with a base station. As described above, the UE may repeat the random access procedure many times using the wrong TA. In such embodiments, after trying the random access procedure N times (e.g., where N may depend on the power ramping parameters, number of repetitions, etc.), however, the UE may determine that the TA is wrong and apply a different TA for the transmission of NPRACH.

At 804, the UE transmits a first message to the base station using an adjusted timing advance (TA) value that is different than a TA value received from the base station in a random access response (RAR) message.

For example, after failing a number of RA procedures without applying the different TA, the UE may transmit NPRACH with a TA of X. The value of X, for example, may be a multiple of the integer time offset (e.g. 266 us). In some cases, the value of X may be another value obtained from the TA in the failed RA procedure, and may be adjusted to go beyond the ambiguity region. For example, if the received TA is 20 us, the UE may assume that the true TA is 286 us (20+266). Then, the UE can apply a TA of 30 us, so that the eNB issues a TA of 256 us.

The UE may then receive a RAR with TA value of Y and apply a total of X+Y, and use that TA value to transmit msg3. In this case, the TA value should now be correct, so the UE should successfully receive msg4.

The UE may include one or more components as illustrated in FIG. 2 that may be configured to perform the operations described herein. For example, the antenna 252, demodulator/modulator 254, controller/processor 280, and/or memory 282 as illustrated in FIG. 2 may perform the operations described herein.

Figure 8A:
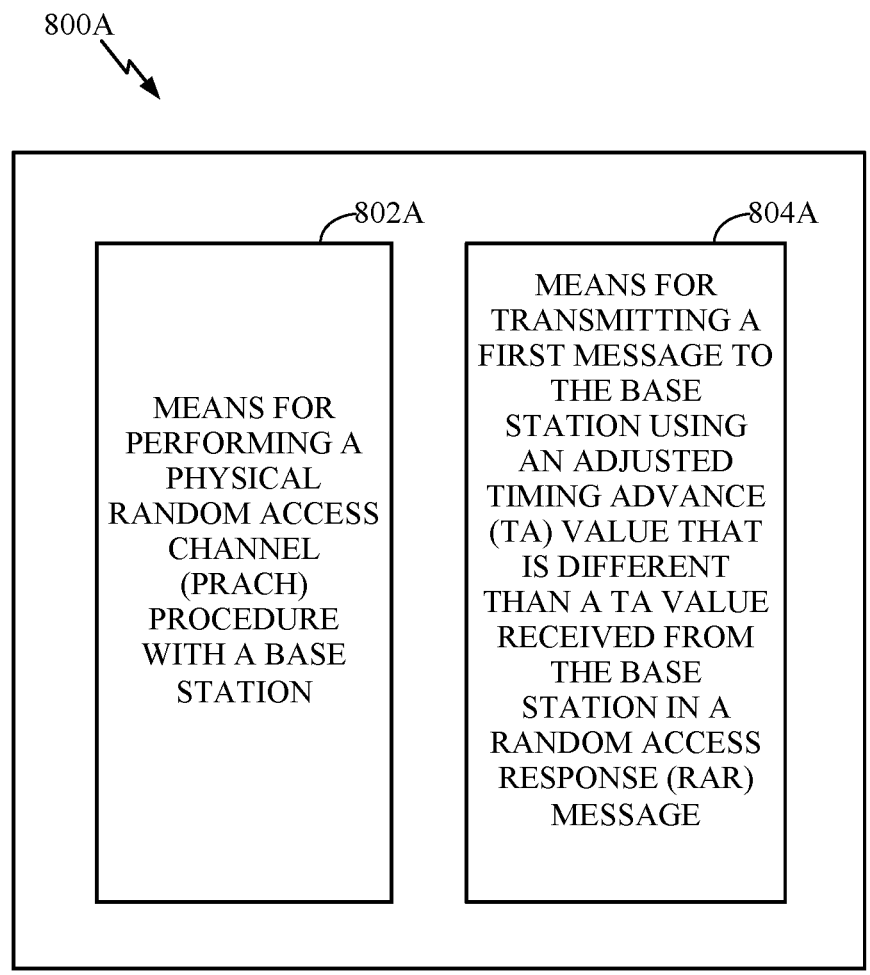
FIG. 8A shows a communication device illustrating means for performing operations for wireless communications, according to certain aspects of the present disclosure.

FIG. 8A illustrates a communications device 800A that may include various means-plus-function components configured to perform the operations illustrated in FIG. 8. As described above, in some embodiments, the communications device 800A may be a UE (e.g., UE 120). For example, at 802A, the communications device 800A includes means for performing the operations illustrated at 802 in FIG. 8. Particularly, in one or more cases, the purpose of the means 802A is to serve as a processing element (e.g., controller/processor 240) and a reception/transmission element (e.g., antenna 234, demodulator/modulator 232, etc.) for the UE 120 for performing a physical random access channel (PRACH) procedure with a base station.

Additionally, at 804A, the communications device 800A includes means for performing the operations illustrated at 804 in FIG. 8. Particularly, in one or more cases, the purpose of the means 804A is to serve as a transmission element (e.g., antenna 234, modulator 232, etc.) for the UE 120 for transmitting a first message to the base station using an adjusted timing advance (TA) value that is different than a TA value received from the base station in a random access response (RAR) message.

Figure 9:
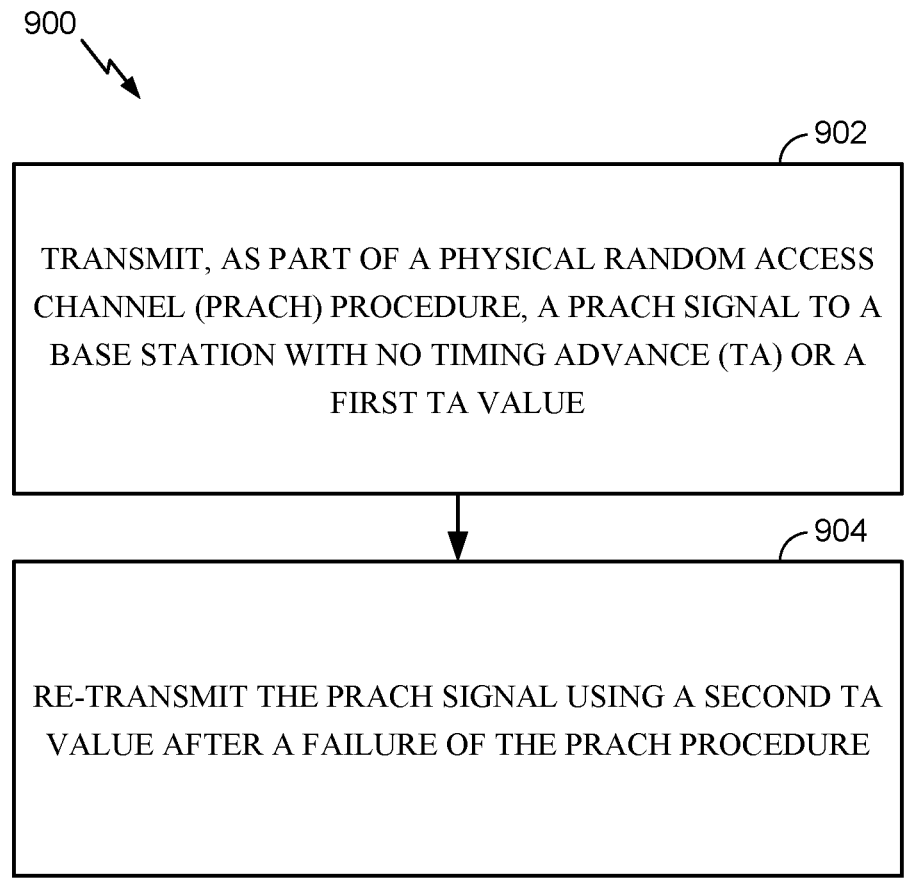
FIG. 9 is a flow diagram illustrating example operations for wireless communications by a UE, in accordance with certain aspects of the present disclosure.

FIG. 9 illustrates example operations 900 for wireless communications. Operations 900 may be performed, for example, by a wireless communications device, such as a UE (e.g., UE 120).

Operations 900 begin at, 902, by transmitting, as part of a PRACH procedure, a PRACH signal to a BS with no TA or a first TA value. For example, in some embodiments, the UE may first transmit NPRACH with no TA and receive a TA value of Y in a RAR from the eNB. After receiving a TA of value Y from the eNB, a second TA (e.g., fake TA X) may be applied by the UE to msg3, as described in relation to step 904.

At 904, the UE re-transmits the PRACH signal using a second TA value after a failure of the PRACH procedure. In some embodiments, the second TA is fake. For example, after receiving a TA of value Y in a RAR from the eNB, the UE may transmit msg3 with total TA of X+Y, with X a multiple of the symbol length (e.g. 266.6 us, 266.6 us*2, . . . ).

In some cases, if the fake TA is applied at the UE side, at a later stage (e.g., during normal data exchange) the UE may send an indication (e.g. via RRC or MAC-CE) of using this fake TA to the eNB. The fake TA may be signaled in terms of number of symbols, or simply ON/OFF.

In some cases, the above procedure may prove relatively costly from UE battery consumption perspective, since it requires multiple RA procedures before getting the correct understanding of TA. Since many NB-IoT UEs are at least quasi-stationary, the UE may store the applied TA from the previous RA procedure and apply it next time it wakes up.

As an example, the UE may first attempt the RA procedure as described above, although that procedure may take some time (and uses a lot of power) since the UE repeatedly receives the wrong TA before applying the TA of X and succeeding.

After the RRC connection is released, the UE may determine that it had to apply the TA of X, so the next time the UE needs to perform a random access procedure it may use the TA of X in the first attempt (or, in general, waiting less time than the first time, for example, decreasing the number of N attempts above).

The UE may apply the TA (or a value X, in general) from the beginning in the next RA procedure it initializes. In some cases, some additional intelligence may be added. For example, the UE may apply the TA of X only if it is in the same cell, or in the same cell (or another cell) AND with a similar RSRP. Otherwise, the UE may restart the whole process described above.

This use of a previous TA may also be utilized in the case of the eNB implementation described above with reference to FIG. 6. If the UE receives a TA that is larger than the 266.6 us (e.g., 266.6+Y), the UE may apply this 266.6 us the next time it attempts to re-connect.

In some cases, the cell may include some type of signaling (e.g. in SIB) to signal to the UE if it is allowed to perform this procedure. For example, only cells that are known to have a big radius may include this signaling. The signaling may be per NPRACH resource, per CE level or per cell.

Figure 9A:
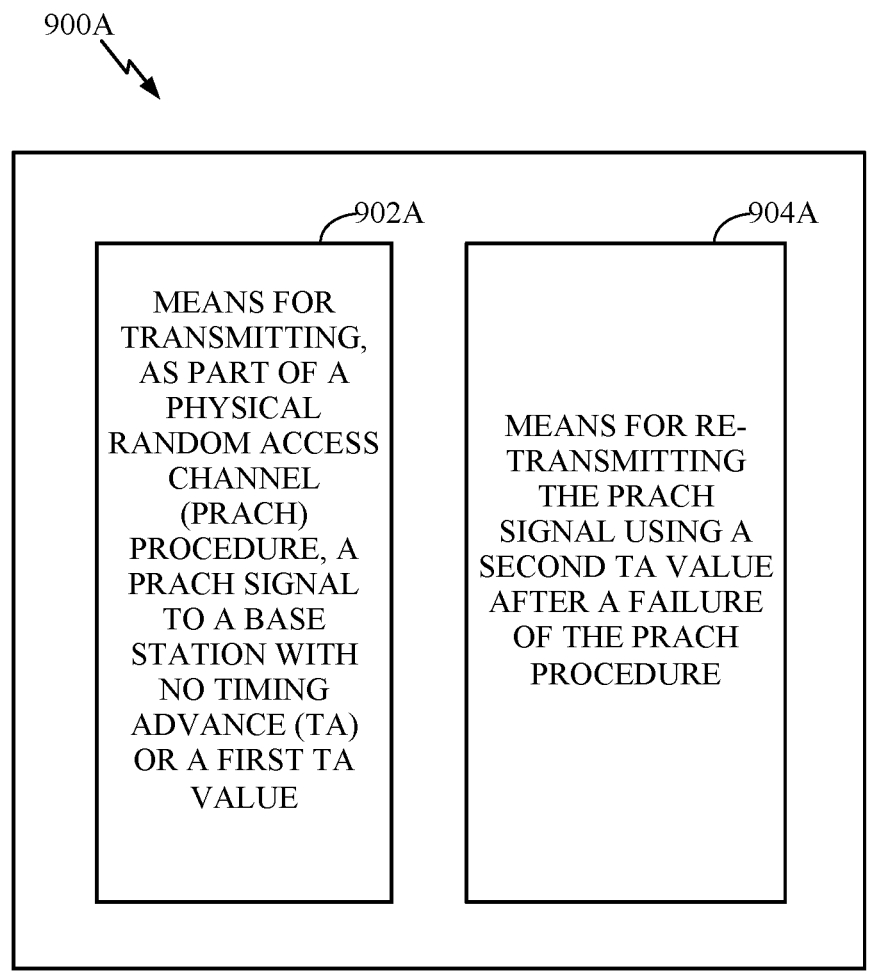
FIG. 9A shows a communication device illustrating means for performing operations for wireless communications, according to certain aspects of the present disclosure.

FIG. 9A illustrates a communications device 900A that may include various means-plus-function components configured to perform the operations illustrated in FIG. 9. For example, at 902A, the communications device 900A includes means for performing the operations illustrated at 902 in FIG. 9. Particularly, in one or more cases, the purpose of the means 902A is to serve as a transmission element (e.g., antenna 234, modulator 232, etc.) for the UE 120 for transmitting, as part of a PRACH procedure, a PRACH signal to a BS with no TA or a first TA value.

Additionally, at 904A, the communications device 900A includes means for performing the operations illustrated at 904 in FIG. 9. Particularly, in one or more cases, the purpose of the means 904A is to serve as a transmission element (e.g., antenna 234, modulator 232, etc.) for the UE 120 for re-transmitting the PRACH signal using a second TA value after a failure of the PRACH procedure.

As described above, FIG. 10 illustrates example operations 1000 by a wireless communications device, such as a UE (e.g., UE 120) for determining a numerology for transmission of a PRACH signal to a BS. Operations 1000 of FIG. 10, in some embodiments, enable a new NPRACH format (e.g. with double duration of 533.2 us, subcarrier spacing of 1.875 kHz, or 800 us, subcarrier spacing of 1.25 kHz).

Operations 1000 begin at, 1002, by determining a numerology for transmitting a PRACH signal to a BS. In some embodiments, a numerology may refer to a subframe duration, a subframe structure, a symbol duration, a transmit time interval (TTI) duration, tone spacing, etc. As described above, the determined numerology enables a new NPRACH format, which may be designed to allow NPRACH transmissions (using this new format) to coexist with the legacy RACH transmissions (e.g., using 3.75 kHz resources). There are various options for configuring this new NPRACH format.

For example, in some embodiments, there may be separate resources for different numerologies, and for each coverage enhancement (CE) level. As an example, CE level 1 may support only a 3.75 kHz cyclic prefix (CP), CE level 2 may support both 3.75 kHz and 1.25 kHz, and different periodicities. In some embodiments, a starting offset and duration (e.g., length) may be defined for each CP (e.g. one for 3.75 kHz, another for 1.25 kHz). If a UE supports 1.25 kHz (e.g. a Rel-15 UE), then it may use 1.25 kHz. Otherwise the UE uses 3.75 kHz.

In some other embodiments, the same time resources are used (i.e., time resources are shared for the new and legacy formats), but some subcarriers/resources may be reserved for the new numerology. Signaling may allow some resources to be reserved for contention-free access, so the eNB may do the following. The eNB may signal that some resources are to be considered as reserved by legacy UEs. The eNB may then use these resources for the new numerology for new UEs. As a result, legacy UEs may rate match around these resources, while new UEs may use them for NPRACH. The legacy resources may be signaled, for example, in terms of 3.75 kHz tones, and the new resources may be signaled in terms of 1.25 kHz tones. In some cases, it may be beneficial to align the resources by, e.g., using similar hopping patterns, or a similar starting point, etc.

At 1004, the UE transmits the PRACH signal in accordance with the determined numerology.

Figure 10:
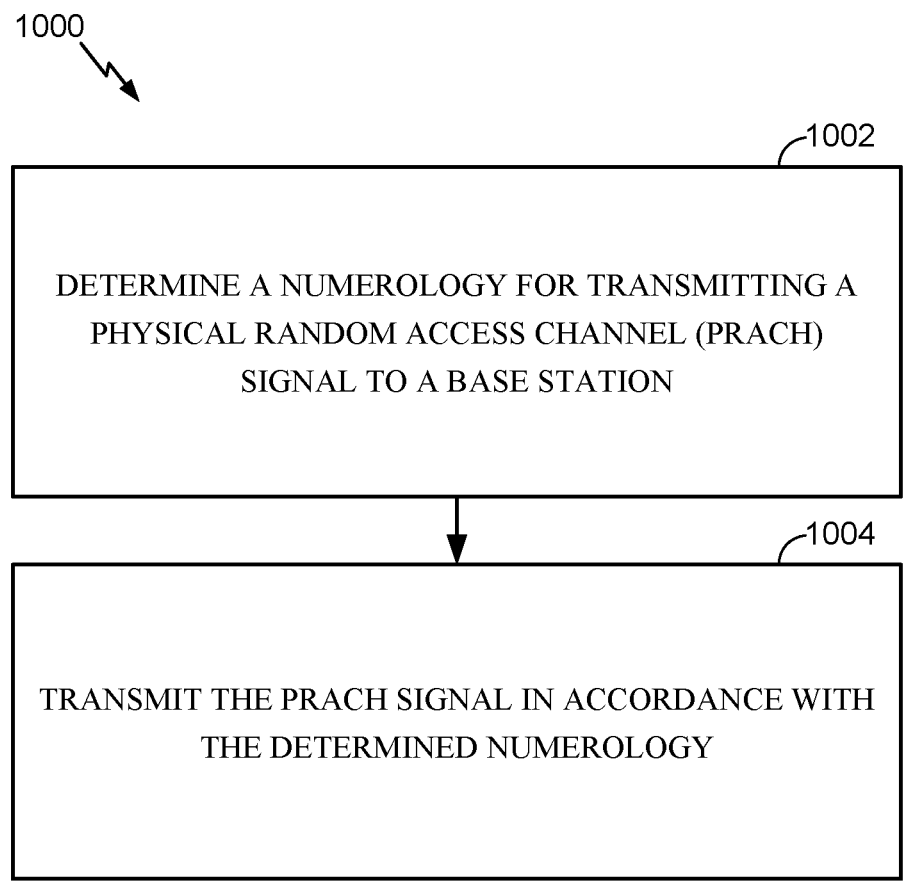
FIG. 10 is a flow diagram illustrating example operations for wireless communications by a UE, in accordance with certain aspects of the present disclosure.
Figure 10A:
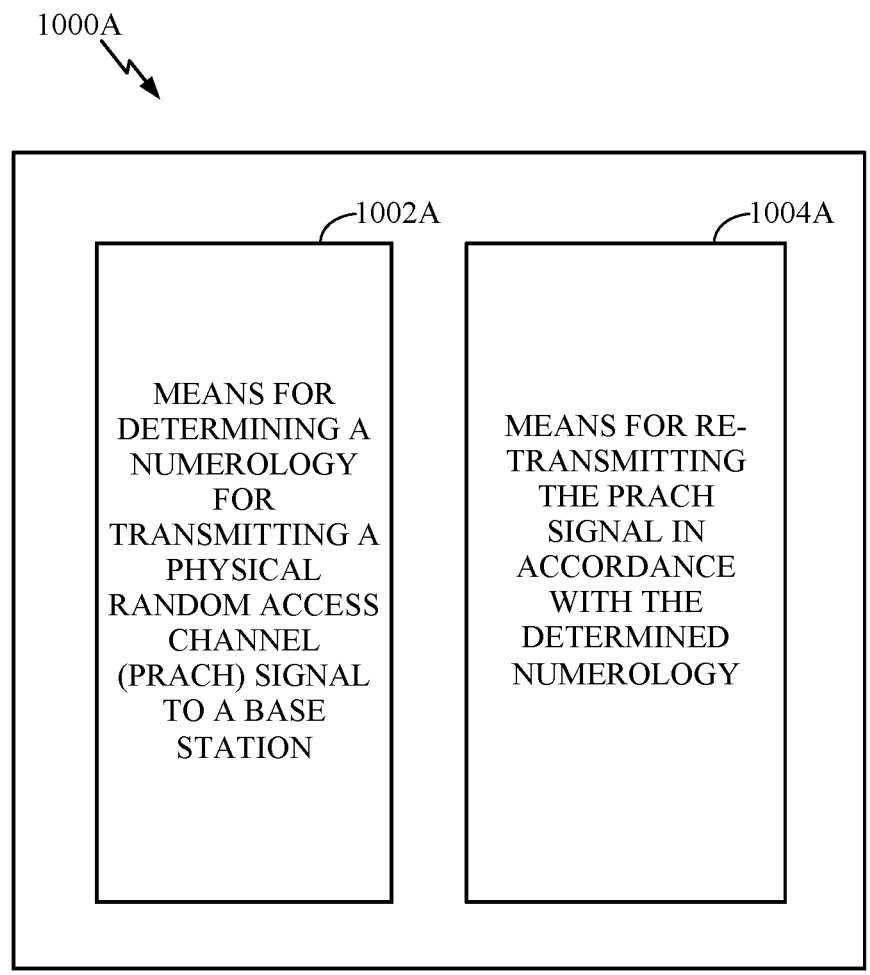
FIG. 10A shows a communication device illustrating means for performing operations for wireless communications, according to certain aspects of the present disclosure.

FIG. 10A illustrates a communications device 1000A that may include various means-plus-function components configured to perform the operations illustrated in FIG. 10.

For example, at 1002A, the communications device 1000A includes means for performing the operations illustrated at 1002 in FIG. 10. Particularly, in one or more cases, the purpose of the means 1002A is to serve as a processing element (e.g., controller/processor 240) for the UE 120 for determining a numerology for transmitting a PRACH signal to a BS. Additionally, at 1004A, the communications device 1000A includes means for performing the operations illustrated at 1004 in FIG. 10. Particularly, in one or more cases, the purpose of the means 1004A is to serve as a transmission element (e.g., antenna 234, modulator 232, etc.) for the UE 120 for transmitting the PRACH signal in accordance with the determined numerology.

As an alternative to using a new numerology to distinguish NPRACH transmissions and allow coexistence with legacy PRACH transmissions, different scrambling sequences may be used. For example, a first set of one or more scrambling sequences may be reserved for UEs with one set of capabilities (e.g., legacy UEs), while a second set of scrambling sequences may be reserved for UE with another set of capabilities (e.g., non-legacy UEs). A base station receiving a RACH transmission may, thus, be able to identify a UE as legacy or non-legacy based on the scrambling sequence used, even if the different types of UEs use the same or overlapping time and/frequency resources.

Figure 11:
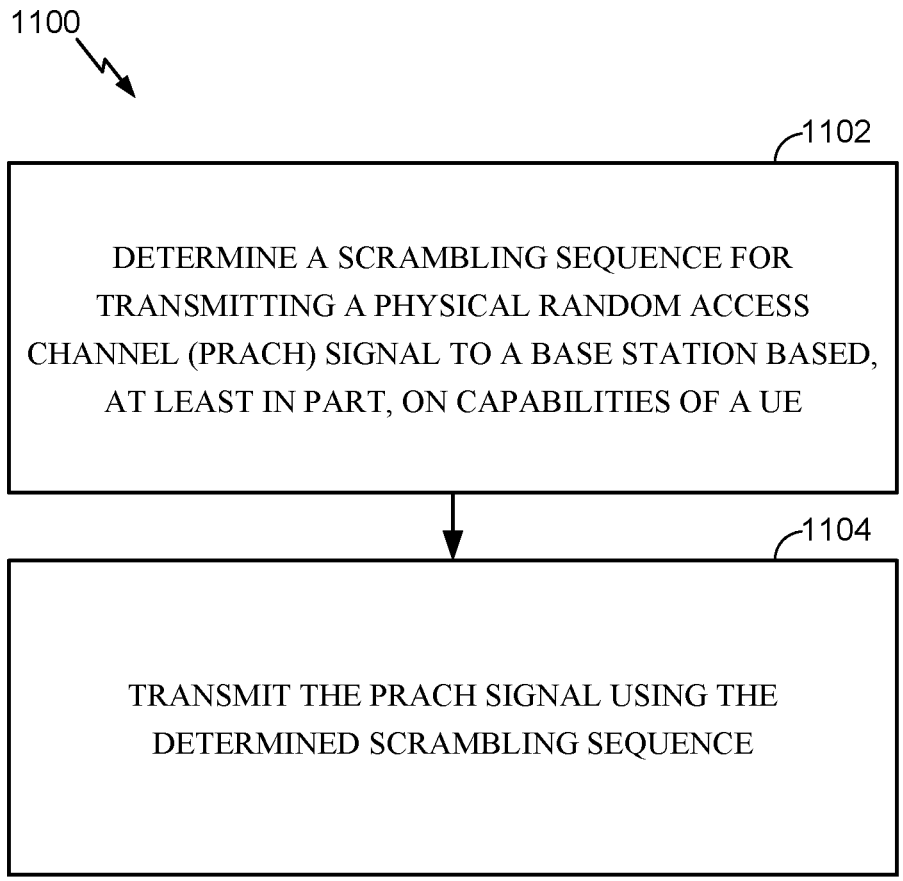
FIG. 11 is a flow diagram illustrating example operations for wireless communications by a UE, in accordance with certain aspects of the present disclosure.

FIG. 11 illustrates example operations 1100 for wireless communications using different scrambling sequences. Operations 1100 may be performed, for example, by a wireless communications device, such as a UE (e.g., UE 120) for determining a scrambling sequence to use for transmitting a PRACH signal.

Operations 1100 begin at, 1102, by determining a scrambling sequence to use for transmitting a PRACH signal to a BS based, at least in part, on capabilities of the UE. As illustrated in FIG. 11, instead of adding a new numerology (as was described in relation to FIG. 10), a UE may determine a scrambling sequence to use for transmitting a PRACH signal (e.g., to be applied on top of a NPRACH transmission). For example, for a 6 symbol NPRACH, a UE may multiply each symbol by a quasi-random sequence that has good autocorrelation properties. In some cases, the scrambling sequence may be a rotated constellation to reduce peak to average power ratio (PAPR) (e.g., this quasi-random sequence can be a pi/2 BPSK or a pi/4 QPSK). This quasi random sequence can be cell-specific and/or resource-specific (i.e., depends on the cell ID and on the tone location of the NPRACH transmission).

At 1104, the UE transmits the PRACH signal using the determined scrambling sequence. In some cases, the resources in which this NPRACH is transmitted may be separate than the ones for legacy UEs. Similar to the approach described above with respect to FIG. 10, these NPRACH resources (scrambling sequences) may be signaled as "reserved" for legacy UEs, and there may be new signaling for non-legacy UEs indicating that these resources should use the new NPRACH formats with scrambling. A new (non-legacy) UE may be configured to always use the new NPRACH formats, or it may be configured to choose randomly or pseudo-randomly between new and old NPRACH formats (e.g. based on some weight). For a PDCCH order, the order may signal if the UE should use the old formats or new formats.

In some embodiments, the UE may combine the operations or approaches shown in FIGS. 10 and 11. For example, in addition to determining a new numerology, as described in relation to FIG. 10, the UE may also apply a scrambling sequence that is reserved for UEs with a certain set of capabilities (e.g., legacy or non-legacy), as described in FIG. 11. The UE may then transmit a PRACH signal using the determined numerology and scrambling sequence.

Figure 11A:
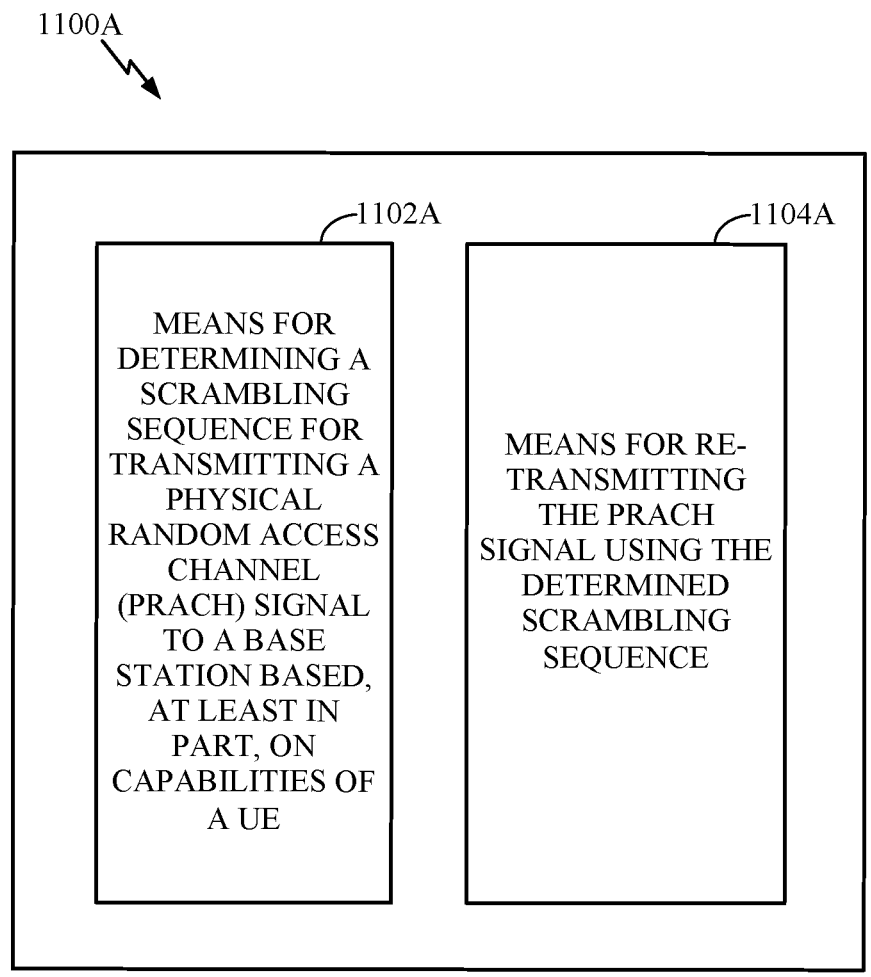
FIG. 11A shows a communication device illustrating means for performing operations for wireless communications, according to certain aspects of the present disclosure.

FIG. 11A illustrates a communications device 1100A that may include various means-plus-function components configured to perform the operations illustrated in FIG. 11. For example, at 1102A, the communications device 1100A includes means for performing the operations illustrated at 1102 in FIG. 11. Particularly, in one or more cases, the purpose of the means 1102A is to serve as a processing element (e.g., controller/processor 240) for the UE 120 for determining a scrambling sequence to use for transmitting a PRACH signal. Additionally, at 1104A, the communications device 1100A includes means for performing the operations illustrated at 1104 in FIG. 11. Particularly, in one or more cases, the purpose of the means 1104A is to serve as a transmission element (e.g., antenna 234, modulator 232, etc.) for the UE 120 for transmitting the PRACH signal using the determined scrambling sequence As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for selecting, means for identifying, means for transmitting, means for receiving, means for sending, means for signaling, and/or means for communicating may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna (s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    obtaining a frequency domain phase offset based on a preamble from a user equipment (UE) transmitted during a random access channel (RACH) procedure;
    determining a fractional symbol timing offset based on the frequency domain phase offset;
    performing a time domain correlation for different timing offset hypotheses, timing offset hypotheses corresponding to different integer numbers of symbols, the time domain correlation comprising correlating a cell size or distance of the UE from the BS to an integer number of symbols timing offset hypothesis; and
    determining a timing advance (TA) for the UE by adding the fractional symbol timing offset to the integer number of symbols timing offset hypothesis.

2. The method of claim 1, wherein the correlating the cell size to the integer number of symbols timing offset hypothesis comprises:
    selecting a zero symbol timing offset hypothesis when the cell size is in a first range;
    selecting a zero or one symbol timing offset hypothesis when the cell size is in a second range larger than the first range; and
    selecting a zero, one, or two symbol timing offset hypothesis when the cell size is in a third range larger than the second range.

3. The method of claim 1, wherein correlating the distance of the UE from the BS to the integer number of symbols timing offset comprises selecting the integer number of symbols timing offset hypothesis correlated to a highest probability distance the UE is from the BS.

4. The method of claim 1, wherein the integer numbers are selected based, at least in part, on a subcarrier spacing.

5. The method of claim 1, wherein the time domain correlation is performed only when the cell size is at or above a threshold size.

6. The method of claim 1, further comprising: generating a random access response (RAR) based on at least two of the different timing offset hypotheses, each response having a field allowing the UE to distinguish between the at least two of the different timing offset hypotheses.

7. The method of claim 1, further comprising performing another time domain correlation based on a RACH message 3 using a different integer number of symbols timing offset hypothesis.

8. The method of claim 7, wherein:
    the time domain correlation based on the RACH message 3 is performed based on results of the time domain correlation based on the preamble.

* * * * *